June 8, 1948. F. S. WATKINS 2,442,833
PIPE HOLD DOWN CLAMP
Filed Aug. 3, 1946 2 Sheets-Sheet 2

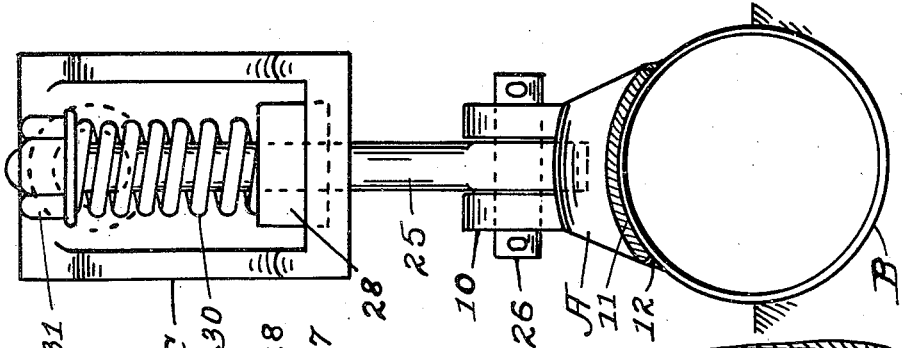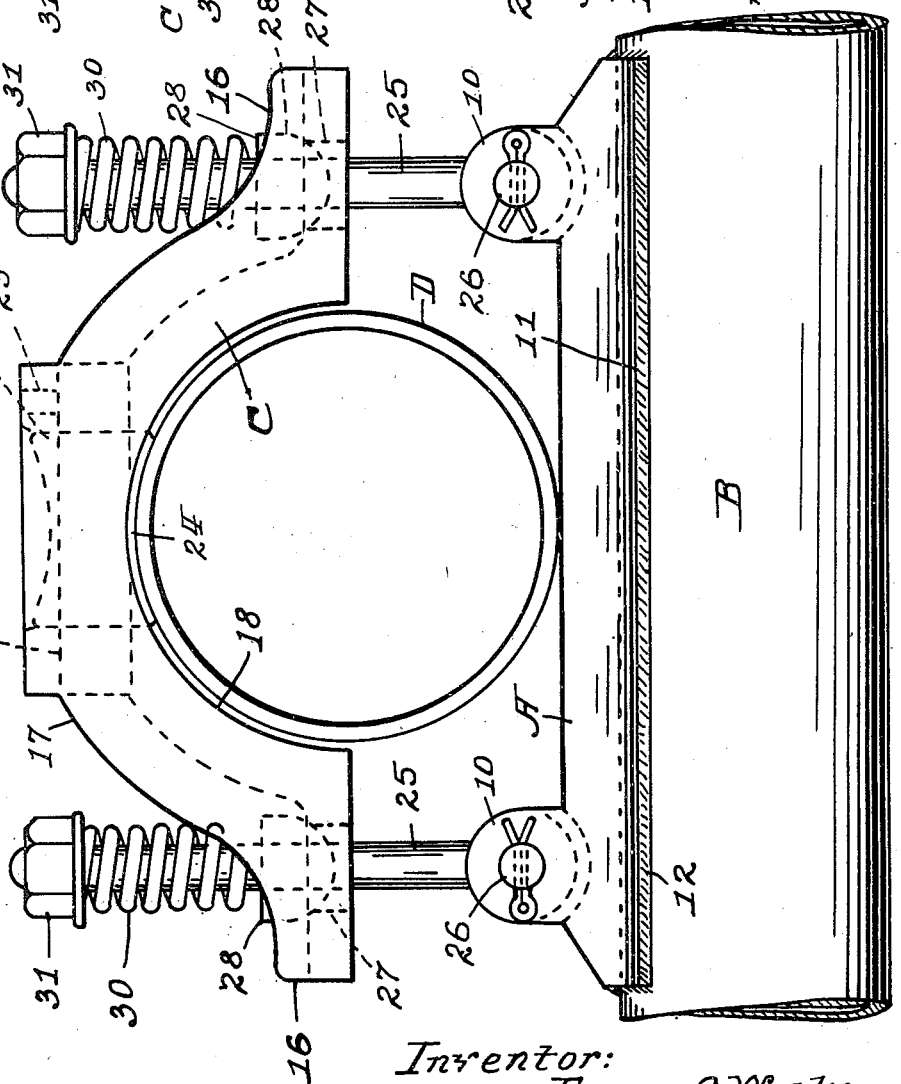

Inventor:
Francis S. Watkins
by: *signature*
Attorney.

Patented June 8, 1948

2,442,833

UNITED STATES PATENT OFFICE 2,442,833

PIPE HOLD-DOWN CLAMP

Francis S. Watkins, Avenal, Calif.

Application August 3, 1946, Serial No. 688,176

4 Claims. (Cl. 248—54)

My invention relates to a pipe hold down clamp and more particularly to means by which strings of gas or other fluid transmission pipes or ducts are movably tied down and fastened in place on the surface of the ground or other support so as to compensate the detrimental effects of vibration and expansion and contraction caused by changes in temperature.

One of the difficulties encountered in the construction stages of compressor plant piping used for conducting gas or other fluid is the control of vibration and expansion or contraction. Due to high pressure maintained in the transmission of gas or other fluid long distances and to vibration in piping caused by the compressing action set up by compressors in compressor plants and to wide variation in tension caused by changes of temperature, transmission pipes occasionally break. The breaking of such piping is extremely hazardous, the pipes usually lashing in various and unpredictable directions with terrific force and usually causing damage and occasionally causing loss of life or personal injury.

In the past it has been common practice to bury gas and fluid conducting piping or ducts several feet in the ground. This has provided a reasonable tie down effect which has allowed reasonable expansion and a cushioning effect against vibration. This type of construction however has the detrimental effect of subjecting the pipes to corrosion and resulting difficulties associated with repairs. Corrosion of piping also frequently causes a line break at an unpredictable time and location thus creating a very dangerous hazard.

By the use of my invention the piping is held in exposed position above the surface of the ground on fabricated pipe supports, low concrete blocks, or on a combination of the two. In this manner the piping is not subjected to excessive action of corrosion. It is also exposed in condition to be easily and frequently examined and can be easily repaired. Crude methods of construction have been employed for mounting the piping on supports. This type of construction heretofore employed while being of low first cost has required continual maintenance due to breakage, etc.

My improved pipe hold down clamp has among its objects the surmounting of the above difficulties; low cost per unit; easy installation without special tools; allowance for expansion and contraction of piping in more than one direction, and adequate tie down effect to control vibration.

Figure 3:
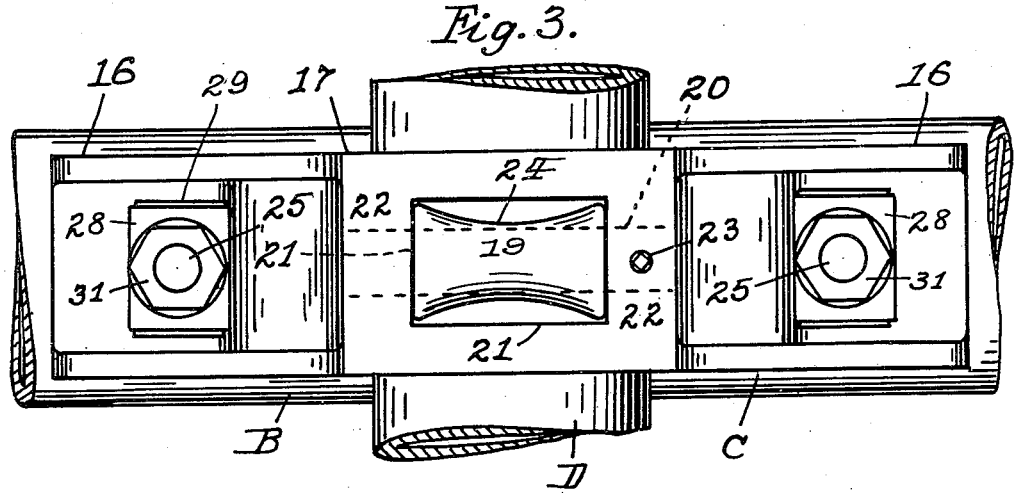
Figure 4:
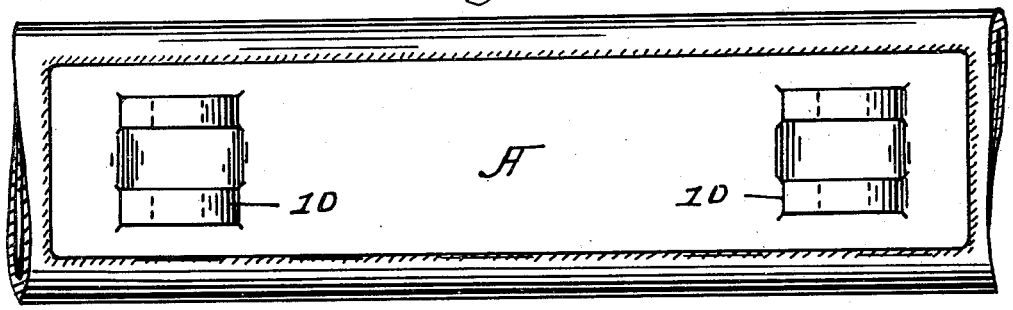
Figure 5:
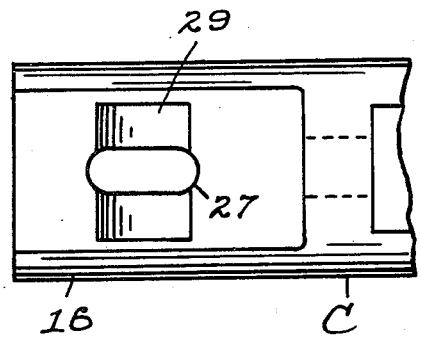

In the accompanying drawing forming part of this specification, Fig. 1 is an elevation looking at one side of my improved pipe hold down clamp showing a gas transmission pipe clamped thereby; Fig. 2 is an end elevation of the structure shown in Fig. 1; Fig. 3 is a plan of the structure shown in Fig. 1; Fig. 4 is a plan of the supporting saddle shown mounted in place upon a portion of the pipe header, and Fig. 5 is a plan of a detail showing an end portion of the yoke.

In the drawings, A is an elongated supporting saddle having pairs 10—10 of upstanding integral bosses formed on its opposite end portions. The lower surface 11 of the saddle is concave transversely at a suitable curvature substantially conforming with the surface of a pipe header B. The pipe header is of suitable length so that when embedded in the ground it provides a substantial and rigid support for the saddle. The saddle is secured to the header by welding at 12 or by any other suitable means and provides an upper flat surface upon which the fluid transmission pipe D is freely supported.

A yoke C is secured in substantially parallel position above the saddle A, said yoke being adapted to cooperate with the saddle and movably clamp the fluid conducting transmission pipe, such as D in place.

The yoke is formed with two opposite downwardly and outwardly extending arm portions 16—16 and an upwardly curved body portion 17 which latter is shaped with a concave inner surface 18 substantially conforming with and spaced from the perimeter of the transmission pipe. Said body portion supports an antifriction roller 19 which is freely and coaxially journaled on the shaft 20, whose axis is disposed horizontally above and transversely to the axis of the transmission pipe D. The antifriction roller is freely rotatable in a vertical opening 21 through the median portion of the body of the yoke between end abutment portions 22 in which the opposite end portions of the shaft 20 are held. The shaft 20 is secured in the abutments 22 by the set bolt 23 or any other suitable means. The perimeter of the roller is curved longitudinally at 24 to substantially conform with the circumferential surface of the transmission pipe upon which the roller bears. In this manner the roller coincides with the transmission pipe to permit free longitudinal movement of the pipe relative to my improved clamping means, when the pipe expands or contracts.

The opposite end portions 16—16 of the yoke are tied or fastened to the saddle by a pair of corresponding tie rods 25, each tie rod being pivotally secured to one of the pairs of bosses 10 by a coupling pin 26 on an axis which is substantially parallel to the axis of the transmission pipe. Each opposite end portion of the yoke has a vertical passageway 27 through which one of the tie rods extends freely upwardly. In this manner the tie rods are free to swing and compensate laterally. Each of the tie rods has a semicylindrical bearing 28 freely slidable thereon which self-centers on the marginal edge of the companion passage 27 and in a concave bearing surface 29 in the saddle which intercepts said passage. Each tie rod is provided with a compression spring 30 which is freely entwined over the shank of the tie rod and held under compression between the bearing 28 and an adjusting nut 31. The latter is threadedly engaged on the upper end portion of the tie rod.

By adjusting the nuts 31 on the opposite pair of tie rods the yoke can be adjusted under resilient pressure to clamp the transmission pipe firmly in self centered position upon the saddle support. When thus adjusted free longitudinal movement of the transmission pipe D is permitted by the roller bearing 19 which compensates expansion and contraction of said pipe. The tie rods also assist in compensating any lateral movement or tendency due to said expansion or contraction. Lateral movement being permitted by the hinged connections and resilient holding means associated with the tie rods. Vibration of the pipe caused by the pumping action of the fluid which is transmitted through the piping is also absorbed and compensated by the spring coupling means provided by the flexible connections of the tie rods with the saddle and yoke. The entire device also effectively serves to securely hold and tie the transmission piping down so that its tendency to break loose and lash is reduced to a minimum.

While I have shown the header in the form of a pipe B it is to be understood that other means such as a concrete abutment or foundation or other effective tie down support may be employed to which the saddle or its equivalent is anchored or secured. Also while I have shown and described a movable bearing guide roller 19, it is to be understood that any suitable type of freely movable bearing can be applied to the yoke or its equivalent for permitting free longitudinal movement of the piping within the spirit of the invention.

In accordance with the patent statutes, I have described the principles of operation of my invention together with the construction thereof which I now consider to represent the best embodiment thereof, but I desire to have it understood that the construction shown is only illustrative and that the invention can be carried out by other means and applied to uses other than those above set forth within the spirit of the invention and the scope of the following claims.

I claim:

1. A fluid transmission pipe hold down clamp, comprising supporting means having a freely disposed transverse supporting surface across which a fluid transmission pipe is movably supported, a yoke having a freely movable bearing engaging over said pipe and permitting free longitudinal movement under expansion and contraction thereof, and resilient tie down means hinged to freely swing laterally on said supporting surface and secured under compression to the opposite end portions of said yoke to secure the latter tightly engaged over the pipe while lateral movement of the pipe is compensated.

2. A fluid transmission pipe hold down clamp, comprising a support functioning as a rest across which the fluid transmission pipe is movably supported, a yoke having a freely movable bearing therein engaging over the transmission pipe to hold said pipe on said support and permit free longitudinal movement of the pipe below said yoke, and resilient tie down means freely journaled to said supporting means to compensate lateral movement of said yoke on the transmission pipe and holding the yoke down under tension to movably maintain the pipe on said supporting means.

3. A fluid transmission pipe hold down clamp, comprising a header, supporting means secured to said header across the surface of which a transmission pipe is adapted to be supported and freely movable laterally and longitudinally, a yoke having an antifriction bearing adapted to freely engage across the surface of the transmission pipe and permit the pipe to expand or contract freely longitudinally, and resilient compensating tie down means pivotally secured to said supporting means and said yoke and movably clamping said yoke and the transmission pipe in freely compensated position laterally and longitudinally on said header.

4. A fluid transmission pipe hold down clamp, comprising a header having a saddle mounted thereon, said saddle having an upper substantially flat transverse pipe supporting surface and tie down engagements disposed at opposite sides of the pipe, a yoke spanning the pipe having a freely movable pipe engaging bearing to permit free longitudinal movement of the pipe, and ties on opposite side portions of the pipe having lower hinged lateral compensating connections with said engagements and upper resilient connections with the end portions of said yoke, whereby the pipe is freely held laterally and longitudinally to fully compensate, expansion, contraction and vibration.

FRANCIS S. WATKINS.

REFERENCES CITED

The following references are of record in the file of this patent:

UNITED STATES PATENTS

| Number | Name | Date |
| --- | --- | --- |
| 813,588 | Rollins | Feb. 27, 1906 |
| 1,016,353 | Morgan | Feb. 6, 1912 |